United States Patent [19]
Wohllebe et al.

[11] Patent Number: 5,842,717
[45] Date of Patent: Dec. 1, 1998

[54] MOTOR VEHICLE OCCUPANT PROTECTION ARRANGEMENT

[75] Inventors: Thomas Wohllebe, Braunschweig; Ruprecht Sinnhuber, Gifhorn, both of Germany

[73] Assignee: Volkswagen AG, Wolfsburg, Germany

[21] Appl. No.: 847,780

[22] Filed: Apr. 28, 1997

[30] Foreign Application Priority Data

Jun. 29, 1996 [DE] Germany ................. 196 26 265.8

[51] Int. Cl.⁶ ................................................. B60R 21/32
[52] U.S. Cl. ................. 280/734; 280/728.3; 280/735
[58] Field of Search ........................... 280/728.2, 728.3, 280/731, 732, 735, 734

[56] References Cited

U.S. PATENT DOCUMENTS

| | | | |
|---|---|---|---|
| 4,773,673 | 9/1988 | Sakurai | 280/728.3 |
| 4,984,168 | 1/1991 | Neukrichner et al. | 364/449 |
| 5,031,931 | 7/1991 | Thuen et al. | 280/735 |
| 5,074,583 | 12/1991 | Fujita et al. | 280/735 |
| 5,080,393 | 1/1992 | DIxon et al. | 280/728.3 |

FOREIGN PATENT DOCUMENTS

| | | |
|---|---|---|
| 1080764 | 7/1980 | Canada . |
| 4217177 | 5/1994 | Germany . |
| 4217174 | 2/1996 | Germany . |

*Primary Examiner*—Paul N. Dickson
*Attorney, Agent, or Firm*—Baker & Botts, L.L.P.

[57] ABSTRACT

An occupant protection arrangement for a motor vehicle includes a folded-together inflatable airbag, a member having an exit opening for the unfolding airbag, and a cover which is releasably held by a cover-retaining arrangement in a position closing the exit opening. In the event of a collision, the cover is moved into a position clearing the exit opening in a controlled manner and without being projected toward a vehicle occupant. To assure a reproducible opening behavior of the cover without the risk of injury to vehicle occupants by a simple arrangement, the cover retainer is released by the action of at least one accelerated inertial mass which is mounted on the cover and/or on the cover retainer.

18 Claims, 4 Drawing Sheets

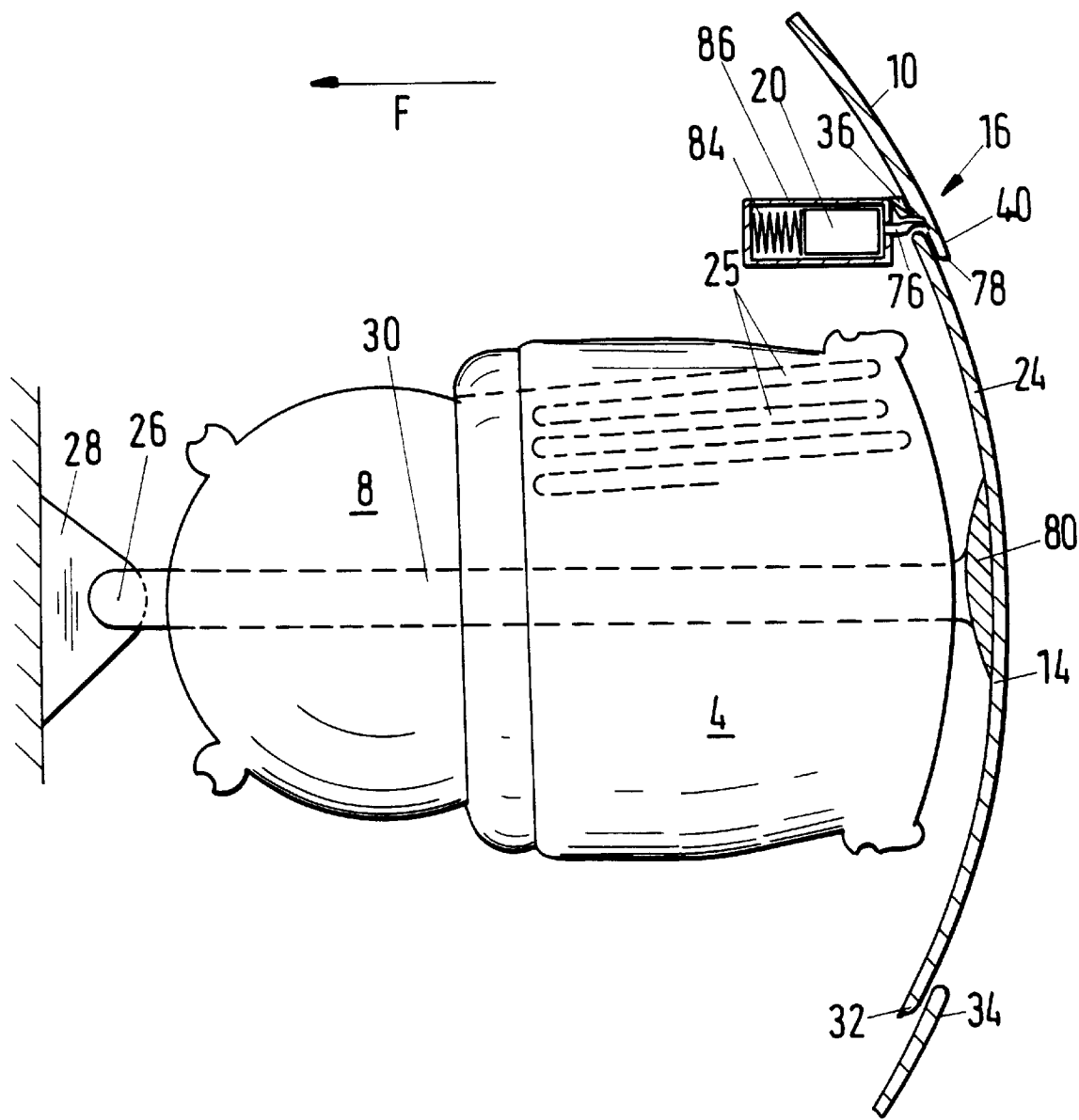

MOTOR VEHICLE OCCUPANT PROTECTION ARRANGEMENT

BACKGROUND OF THE INVENTION

This invention relates to motor vehicle occupant protection arrangements which include at least one folded-together inflatable airbag, an exit opening for the unfolding airbag, and also a cover which is securely held by a cover-retaining arrangement in a position closing the exit opening, the protection device being arranged so that, in the event of a collision, the cover is moved in a controlled manner to expose the opening without causing the cover to be projected toward an adjacent vehicle occupant.

In most known occupant protection arrangements for motor vehicles having an inflatable passenger airbag, the folded-together airbag is arranged behind the instrument panel of the vehicle. The instrument panel usually has a clearance in the unfolding direction of the airbag providing an exit opening through which the airbag can expand into the vehicle interior in the direction of the passenger in the event of a collision. For safety and appearance reasons, the exit opening is generally closed by a cover which is detachably fastened to the instrument panel, for example with the aid of clips, film hinges, straps or other retaining arrangements. When the airbag inflates, the cover is often opened explosively or by impact from the airbag in order to clear the exit opening. In such cases, the cover is usually accelerated in an uncontrolled manner in the direction of the interior of the motor vehicle and toward an adjacent occupant so that the risk of injury to a passenger caused by the opening movement of the cover cannot be ruled out. This is particularly true in relatively small motor vehicles and in situations in which a passenger is not in the customary sitting position at the instant of impact with an obstacle but is, for example, bending forward into the vicinity of the airbag exit opening.

To solve this problem, German offenlegungsschrift No. 42 17 174 discloses an occupant protection arrangement of this type in which the exit opening is normally closed by a cover which is made of a foam padding. In the event of a collision, the cover is pivoted in a controlled manner behind the instrument panel without the possibility of being projected toward a vehicle occupant. In this case, the cover forms part of a pivotable airbag housing, which is pivoted together with the cover in order to bring its open exit side into line with the exit opening in the instrument panel of the motor vehicle. The cover is pivoted by a pyrotechnic propellant charge which acts through a lever mechanism on the airbag housing and consequently also on the cover. The lever mechanism also provides a retaining arrangement which normally securely retains the airbag housing in the position in which the cover closes the exit opening.

With this occupant protection device, however, the period of time between the response of a collision sensor in the motor vehicle and the beginning of the inflation of the airbag is delayed by important fractions of a second because, before igniting a gas generator for the airbag, it is first necessary to wait for the igniting of the pyrotechnic propellant charge and the complete pivoting of the airbag housing. Otherwise, catching or tearing open of the airbag at the edge of the exit opening cannot be ruled out. In addition, this occupant protection arrangement has a more complex and costly construction because of the required lever mechanism or the additional pyrotechnic propellant charge, and, if the pyrotechnic propellant charge fails, the airbag does not inflate.

SUMMARY OF THE INVENTION

Accordingly, it is an object of the present invention to provide a motor vehicle occupant protection arrangement which overcomes disadvantages of the prior art.

Another object of the invention is to provide a motor vehicle occupant protection arrangement which assumes a reproducible opening of the airbag exit cover without the risk of injury to vehicle occupants in a simple and effective manner. These and other objects of the invention are attained by providing an airbag arrangement having an exit opening which is normally closed by a cover and a cover-retaining arrangement which includes an inertial mass arranged to be accelerated upon a collision so as to cause the cover to clear the airbag exit opening. The inertial mass may be associated with either the cover or the cover-retaining arrangement.

In accordance with the invention, a considerably simpler structure is provided in comparison with the prior art, permitting an accelerated inertial mass on the cover and/or the cover retainer to open the exit opening. It is likewise possible to provide a desired time sequence in the removal of the cover and the actuation of the airbag. In addition, the actuating arrangements for removal of the cover and for actuation of the airbag are completely separated from each other so that it is possible to open the cover even before a collision sensor initiates the igniting of the airbag gas generator. Moreover, the operating principle on which the release of the cover-retaining arrangement is based, i.e., that of an acceleration of an inertial mass, is already known from other acceleration sensors, permitting very accurate setting of the acceleration conditions required for triggering the cover retainer.

In a preferred embodiment of the invention, the inertial mass acts on the cover itself, preferably in such a way that it exerts on the cover a force which is proportionally greater with increasing acceleration. This results in the cover-retaining arrangement being released when a predetermined acceleration limit value is exceeded and, because of the continued action of the inertial mass on the cover, the acceleration of the inertial mass can also be used for removing the cover quickly from the region of the exit opening. Alternatively or additionally, an inertial mass may be provided which acts directly on the cover retainer and, when a predetermined acceleration limit value is exceeded, for example, the inertial mass moves a blocking element for the cover-retaining arrangement to such an extent that the cover is released. In this case, the cover is removed rapidly from the region of the exit opening by the action of its own weight or the action of an additional weight acting on the cover, or of a further inertial mass and/or with the aid of forces which the unfolding airbag exerts on the cover.

To ensure a controlled movement of the cover without causing it to approach an adjacent vehicle occupant, the cover preferably includes at least one flap supported from a pivot point so that, after release of the cover retainer, the cover is pivoted into the open position by acceleration of the inertial mass, by a component of the gravitational force of the weight of the cover or of an additional weight, or by the unfolding airbag. As an alternative, however, the cover may also comprise a roller screen or a slide which, with the aid of the inertial mass, or a component of the force of the weight of the cover and/or by the unfolding airbag, is moved out of the region of the exit opening in order to clear the opening.

If the unfolding airbag is used to help move the cover away from the exit opening, the airbag may, according to a further preferred embodiment of the invention, be folded in such a way that it first unfolds near a part of the exit opening which is first uncovered by motion of the cover, i.e. for a pivotable or slidable cover, a part which is adjacent to the rear end of the cover with respect to the direction of cover movement during opening. As a result, a first layer of folds of the airbag is projected out through the already open part of the exit opening and, as the airbag unfolds, it assists in moving the cover completely out of the exit opening. Alternatively or additionally, the cover may have a contact surface which faces the unfolding airbag and is inclined with respect to a direction of movement of the cover during opening so that the unfolding airbag acts on the cover with a force which accelerates the opening of the cover.

According to a further advantageous embodiment of the invention, in order to assure a predetermined opening behavior of the cover when the inertial mass applies a force acting on the cover, the force applied by a cover-retaining arrangement to keep the cover closed and a detaching force opposing the retaining force and exerted on the cover-retaining arrangement by acceleration of the inertial mass and, possibly, by a component of the gravitational force of the weight of the cover, are matched to each other in such a way that the cover-retaining arrangement is opened when a predetermined negative acceleration of the motor vehicle is exceeded. This predetermined negative acceleration is preferably less than a negative acceleration required to initiate igniting of the airbag gas generator.

In order to set a predetermined cover-retaining force, the cover-retaining arrangement may constitute a detent structure which includes two detent elements in locking engagement, one of which is connected to the cover while the other is fixed in place. At least one of the detent elements may be elastically deformable in response to the inertial force exerted on the cover, permitting the two detent elements to be separated from each other when the negative acceleration of the motor vehicle exceeds a predetermined value and, as a result, the inertial force or a detaching force induced by the inertial force and acting on the cover retainer, exceeds the retaining force of the cover retainer.

As an alternative, the cover retainer may include a permanent magnet and a ferromagnetic retaining element which, when the cover is closed, engage each other and form a magnetic retaining arrangement so that when a predetermined acceleration of the motor vehicle is exceeded, the retaining elements are separated directly or indirectly as a result of the inertial force produced by the inertial mass.

According to a further preferred embodiment of the invention, the opening movement of the cover is reversible, so that the cover can be closed again if the airbag is not activated. According to this arrangement, after pivoting or sliding of the cover back into the original position to close of the exit opening, the cover-retaining arrangement, for example, the two detent elements or the two magnetic elements, are brought back into cover-retaining engagement with each other. In either case this can be carried out in a simple way without any replacement of parts.

BRIEF DESCRIPTION OF THE DRAWINGS

Further objects and advantages of the invention will be apparent from a reading of the following description in conjunction with the accompanying drawings, in which:

FIG. 4 is a schematic cross-sectional view through a part of an instrument panel and an integrated passenger airbag in yet another embodiment of a motor vehicle occupant protection arrangement according to the invention.

DESCRIPTION OF PREFERRED EMBODIMENTS

Figure 1:
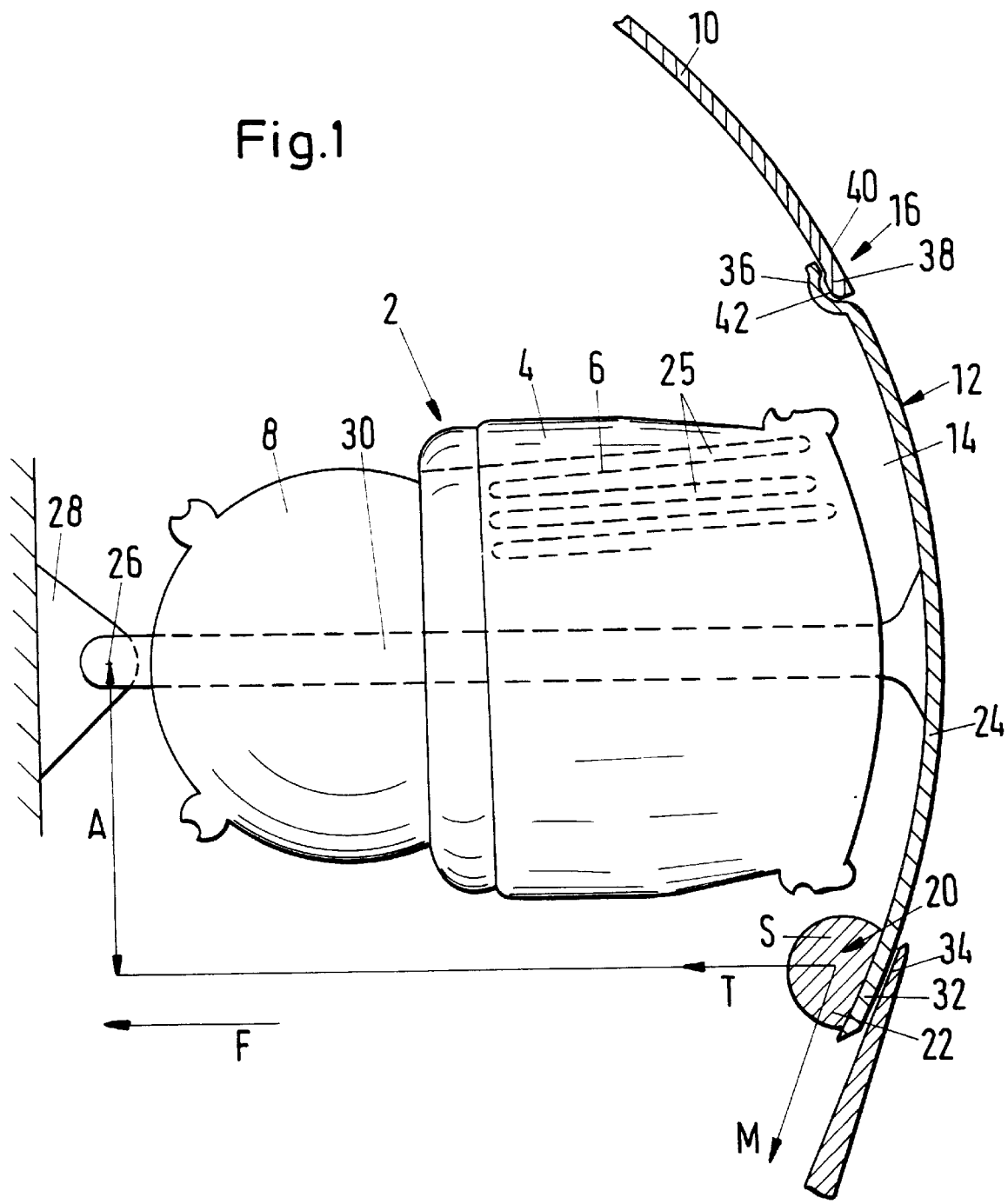
FIG. 1 is a schematic cross-sectional view through a part of an instrument panel and an integrated passenger airbag in a representative embodiment of a motor vehicle occupant protection arrangement according to the invention.

In the typical embodiments of the invention shown in the drawings, an occupant protection arrangement for passenger motor vehicles includes a passenger-side airbag module 2 which essentially includes a folded-together airbag 6 enclosed by an airbag container 4 and a gas generator (not visible) contained in a generator housing 8. The airbag module 2 is mounted behind an instrument panel 10 which has an exit opening 14, normally closed by a cover 12, to permit the unfolding airbag 6 to be projected toward a vehicle occupant. The cover 12 in each case is securely held by a cover-retaining arrangement 16 in a normal or closed position shown in the drawings in which the cover completely closes the corresponding exit opening 14.

In each of the illustrated embodiments, the cover-retaining arrangement 16 is designed so that it will release the cover 12 if a retaining force exerted by the cover-retaining arrangement is exceeded by a detaching force generated when there is a negative acceleration of the motor vehicle such as, for example, during braking or during a collision with an obstacle. The detaching force is exerted by at least one inertial mass connected to the cover 12 in the cover-retaining arrangements of FIGS. 1–3 or on a blocking element in the cover retaining arrangement 16 of FIG. 4 as a result of the inertial force applied by the inertial mass. The retaining force of the cover-retaining arrangement 16 is set as a result of the design or dimensioning of the cover-retaining arrangement and is matched to the size and direction of movement of the inertial mass in such a way that it is only exceeded when there is a relatively great negative acceleration of the motor vehicle. The acceleration required to exceed the retaining force is, however, less than the acceleration required to operate an acceleration sensor (not shown) which triggers the igniting of the airbag gas generator. As a result, the cover-retaining arrangement 16 is already released and the cover 12 is at least partially open when the gas generator is ignited by the acceleration sensor.

In the exemplary embodiment illustrated in FIG. 1, the cover 12 is a pivotally supported flap 24 in essentially the shape of a cylinder segment having a central axis which is the pivot axis 26 of a stationary pivot bearing 28 positioned ahead of the airbag module 2 in the direction of travel represented by the arrow F. Affixed to each of the is opposite ends of the pivotable flap 24 adjacent to the ends of the exit opening 14 is a pivoting arm 30 which supports the flap 24 from the pivot bearing 28. The pivoting arms 30 are rigidly connected to the pivoting flap 24 and extend laterally past the airbag module 2.

The inertial mass 20 is mounted on the lower edge 32 of the flap 24 which overlaps and is spaced a small distance inside the adjacent edge 34 of the exit opening 14. The inertial mass 20 comprises a horizontally-extending metal rod 22, which is positioned on the inner side of the lower edge 32 of the flap 24, extending over the entire width of the flap 24 so that it moves together with the flap 24 about the pivot axis 26.

The cover-retaining arrangement 16 is, in this embodiment, positioned at the upper edge of the flap 24 or of the exit opening 14 and is in the form of a detent consisting of a movable detent element formed as a groove 42 in the elastically deformable upper edge 36 of the flap 24, and a fixed detent element in the form of a complementary rounded rib 38 which protrudes beyond the inner side of the adjacent upper edge 40 of the exit opening 14 and engages the groove 42 of the elastically deformable edge 36. The retaining force of the detent cover retainer 16 corresponds to the force which is required to deform the edge 36 of the flap 24 sufficiently for it to be able to move away over the rib 38. This deforming force can be changed by altering the flexural rigidity of the edge 36 of the flap 24 and by changing the height of the rib 38.

When there is a negative acceleration of the motor vehicle, an inertial force T acts in the direction of travel F on the metal bar 22, causing the metal bar 22 to exert a torque M about the pivot axis 26 on the flap 24, the magnitude of the torque corresponding to the product of the inertial force T and the vertical distance A between the pivot axis 26 and the center of gravity S of the inertial mass 20. opposing the action of the torque M on the flap 24 is the retaining force of the cover-retaining arrangement 16, which retains the flap 24 in the closed position as illustrated as long as the deforming or detaching force induced by the torque M and acting on the edge 26 of the flap 24 does not exceed the retaining force of the cover-retaining arrangement 16.

The retaining force and the torque M are matched to each other by corresponding selections of the flexural rigidity of the edge 36 of the flap 24 and the height of the rib 38 or the size of the inertial mass 20 and of the distance A, in such a way that, in the event of a collision, the cover retaining arrangement 16 is released before the acceleration sensor of the airbag gas generator is actuated. After release of the cover retainer 16, the flap 24 is pivoted by the continued action of the inertial mass 20 on the cover and by the increasing vertical distance A between the pivot axis 26 and the center of gravity S of the inertial mass 20. This increases the acceleration of the flap 24 into the completely open position, in which the upper edge 36 of the flap is adjacent to the region of the lower edge 34 of the exit opening 14 and motion of the flap 24 is terminated by a stop (not shown).

In case the flap 24 has not yet completely uncovered the exit opening 14 when the airbag gas generator is ignited, the airbag 6 is folded in the airbag container 4 in such a way that the uppermost folds 25, which are alongside the first-cleared upper part of the exit opening 14, are inflated first. As a result, the unfolding airbag 6 is pushed out through the open part of the exit opening 14 between the upper edge 36 of the flap 24 and the upper edge 40 of the exit opening 14 and assists in completely opening the flap 24 during unfolding of the airbag.

Figure 2:
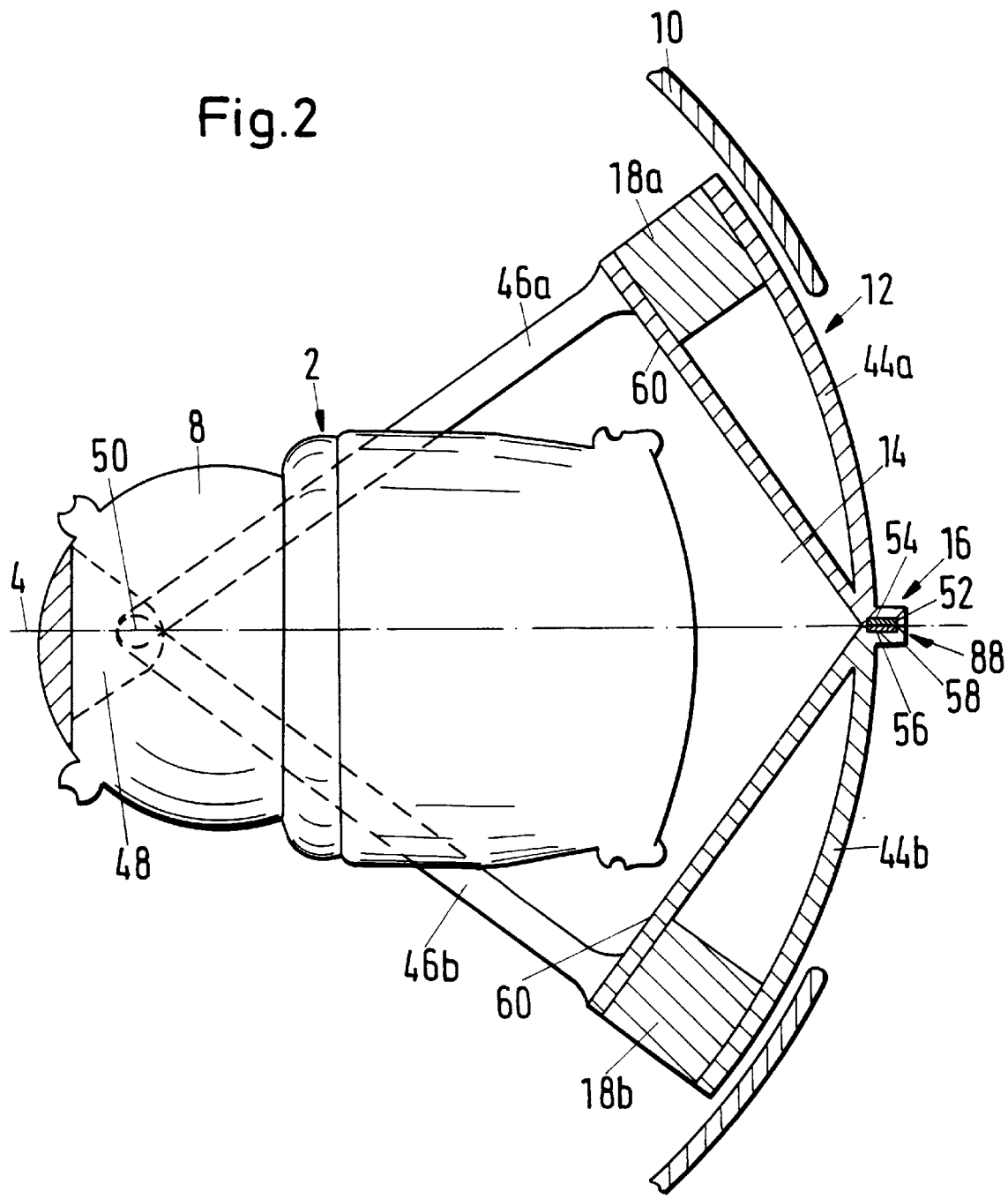
FIG. 2 is a schematic cross-sectional view through a part of an instrument panel and an integrated passenger airbag in a further embodiment of a motor vehicle occupant protection arrangement according to the invention.
Figure 3:
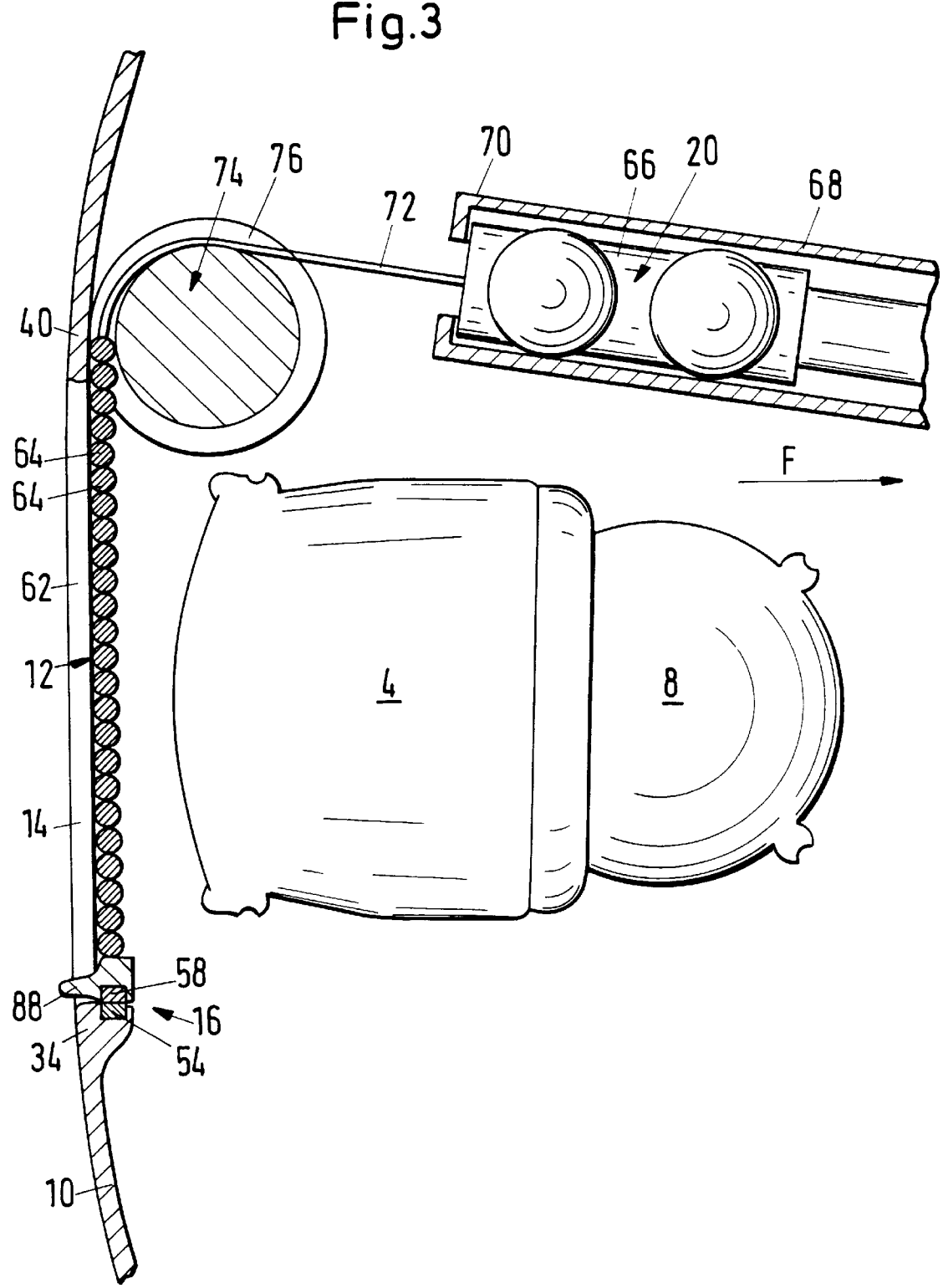
FIG. 3 is a schematic cross-sectional view through a part of an instrument panel and an integrated passenger airbag in another embodiment of a motor vehicle occupant protection arrangement according to the invention.

As an alternative, in the exemplary embodiment shown in FIG. 2, there are provided two flaps 44a and 44b, which are mirror-images with respect to a horizontal center plane 43 of the exit opening 14 and of the airbag module 2. The flaps 44a and 44b open in opposite directions, in each case under the action of an inertial mass 18a or 18b, respectively, as soon as the cover retainer 16, which is located between the engaging ends of the flaps 44a and 44b, is released. Each of the two pivoting flaps 44a and 44b is connected by two lateral pivoting arms 46a and 46b, only one of which is visible in the drawing, to two stationary pivot bearings 48, only one of which is visible, arranged on both sides of the generator housing 8 and having common pivot axis 50.

In this embodiment, the cover-retaining arrangement 16 comprises a strip 54 of permanent magnet material which is fitted into a groove-shaped recess 52 in the edge of the flap 44a adjacent to the center plane 43 and a strip 58 of a ferromagnetic material which is fitted into a corresponding opposed recess 56 in the edge of the other flap 44b. The strips 54 and 58 extend over part or the entire width of the pivoting flaps 44a and 44b and, in the closed position of the pivoting flaps 44a and 44b shown in FIG. 2, they are held together by the magnetic force of attraction which acts as a cover-retaining force. Two stops (not shown) on the sides of the flaps 44a and 44b prevent the two flaps 44a and 44b from moving together in the same direction from the closed position shown in FIG. 2. The inertial masses 18a and 18b are mounted on the inner side of the upper and lower edges, respectively, of the upper and lower pivoting flaps 44a and 44b. The inertial masses are spaced at a distance from the center plane 43 so that, when there is a negative acceleration of the vehicle, they exert torques in opposed directions on the two pivoting flaps 44a and 44b. The cover-retaining arrangement 16 is released if the detaching forces acting on it as a result of the torques exceed the magnetic forces of attraction between the two strips 54 and 58.

To assist the further opening of the pivoting flaps 44a and 44b in response to the continuing action of the inertial forces and the resulting torques, and to ensure rapid unfolding of the airbag 6, each of the inner sides of the flaps 44a and 44b has a surface 60 which faces the airbag container 6 and is oriented at an acute angle of about 50 degrees with respect to the unfolding direction of the airbag 6, i.e. with respect to the center plane 43. Consequently, if the airbag is inflated before the exit opening 14 is cleared completely, the unfolding airbag 6 presses onto the pivoting flaps 44a and 44b in a controlled way.

In the embodiment shown in FIG. 2, the inertial masses 46a and 46b or their distances from the center plane 43 may be reduced in magnitude so that the flaps 44a and 44b only open if compressive forces are exerted on the sloping surfaces 60 by the unfolding airbag 6, in addition to the inertial forces.

As an alternative to the embodiments described above, in the typical embodiment shown in FIG. 3, the cover 12 is in the form of a roller screen which normally closes the exit opening 14 and, when a predetermined negative acceleration is exceeded, is opened by the action of inertial mass 20. The roller screen 62 includes a plurality of parallel plastic slats 64 which are connected to each other in an articulated manner and are pulled upward by the inertial mass 20 if the inertial force of the inertial mass 20 transmitted to the roller screen 62 exceeds the retaining force of the retaining arrangement 16. In this example, the retaining arrangement is a magnetic retainer similar to that of the embodiment described above in connection with FIG. 2.

The inertial mass 20 is provided in this case by a carriage 66 which is positioned symmetrically with respect to the vertical center plane of the exit opening 14 and above the airbag generator housing 8. The carriage 66 has four wheels and is supported for motion by a guide 68 essentially in the direction of travel F of the motor vehicle. The guide 68 is inclined slightly downwardly with respect to the direction of travel F in order to maintain the roller screen 62 taut, and it includes a rear stop 70, in the direction of travel F, against which the carriage 66 is stopped in the closed position to prevent sagging of the roller screen 62 when there is a strong positive acceleration of the motor vehicle.

The uppermost slat 64 of the roller screen 62 is connected to the carriage 66 by a fabric pulling strip 72 so that the inertial force of the carriage 66 is transmitted directly to the roller screen 62. The pulling strip 72, which extends to the uppermost slat 64 of the roller screen 62 and is connected to that slat, passes over a rotatable drum 74 which has the same width as the roller screen 62 and includes lateral guiding end pieces 76.

If the inertial force corresponding to the product of the mass of the carriage 66 and the negative acceleration of the motor vehicle exceeds the value of the magnetic force of attraction providing the retaining force of the retaining arrangement 16, the retainer is released and the roller screen 62 is pulled up by the carriage 66, so that the screen runs over the rotating drum 74. The path of movement of the carriage 66 in the direction of travel of the motor vehicle is chosen to have sufficient length that the roller screen 62 is open completely at the end of the carriage movement.

In the embodiment illustrated in FIG. 4, one difference from the preceding embodiments is that the inertial mass 20 does not act on the cover 12 but acts on the cover-retaining arrangement 16 so that, when a predetermined negative acceleration of the motor vehicle is exceeded, the inertial mass, as a result of its inertial force, displaces a blocking element of the cover-retaining arrangement 16 to such an extent that the retaining arrangement is released.

In the simplest case, the blocking element is, as shown, a blocking bolt 76 which is rigidly connected to the inertial mass 20 and passes through a bore 78 in the flap 24. Apart from having no inertial mass and having a weight 80 fitted centrally on its inner side and symmetrical with respect to its horizontal center plane, the flap 24 corresponds essentially to that of FIG. 1.

In a manner similar to that of conventional acceleration sensors, the cylindrical inertial mass 20 of FIG. 4 can be displaced against the force of a helical compression spring 84 in the direction of travel F in a cylindrical housing 86 which has an end face facing the upper edge 36 of the flap 24 and has an opening for the blocking bolt 76. When the predetermined negative acceleration of the motor vehicle is exceeded, the inertial mass 20 is displaced against the spring force in the housing 86 in the direction of travel F to such an extent that the cover-retaining blocking bolt 76 leaves the bore 78 in the flap 24 and consequently releases the flap for downward motion. The downwardly acting gravitational component of the force of the weight 80 then pivots the flap 24 downwardly to clear the exit opening 14.

In all the exemplary embodiments described herein, the movement of the cover 12 following release by the cover retainer is reversible, that is to say the cover 12 can be closed again manually if the negative acceleration in the event of a collision is sufficient to cause the cover 12 to open but is less than the acceleration required for the airbag 6 to be activated. To facilitate the reclosing of the cover 12 in the certain of the embodiments, part of the cover-retaining arrangement 16 is formed as a projecting manual gripping element 88, which may serve at the same time as a stop, in order to prevent opening of the cover 12 beyond the position in which the exit opening 14 is completely cleared.

Although the invention has been described herein with reference to specific embodiments, many modifications and variations therein will readily occur to those skilled in the art. Accordingly, all such variations and modifications are included within the intended scope of the invention.

We claim:

1. A motor vehicle occupant protection arrangement comprising:
   at least one folded-together inflatable airbag,
   a member having an exit opening for unfolding of the airbag,
   a cover which is retained by a cover-retaining arrangement in a position closing the exit opening and, in the event of a collision, is moved in a controlled manner into a position clearing the exit opening, and
   the cover-retaining arrangement directly responsive to inertial force produced by an accelerated inertial mass to permit opening of the cover to the clearing position.

2. A motor vehicle occupant protection arrangement according to claim 1 wherein the inertial mass acts on the cover.

3. A motor vehicle occupant protection arrangement according to claim 2 wherein the inertial mass acts on the cover during the movement of the cover into a position clearing the exit opening and contributes to opening of the cover.

4. A motor vehicle occupant protection arrangement according to claim 1 wherein the cover comprises at least one pivotally supported flap.

5. A motor vehicle occupant protection arrangement according to claim 1 wherein the cover comprises a roller screen.

6. A motor vehicle occupant protection device according to claim 1 wherein the cover-retaining arrangement comprises a magnetic retainer including a permanent-magnet element and a ferromagnetic retaining element cooperating therewith which are moved apart by the inertial force of the inertial mass when a predetermined acceleration of the motor vehicle is exceeded.

7. A motor vehicle occupant protection arrangement according to claim 6 wherein one of the two elements is stationary and the other element is connected to the cover.

8. A motor vehicle occupant protection device according to claim 1 wherein the cover-retaining arrangement comprises a detent retainer and includes two detent elements capable of locking engagement, at least one of which is elastically deformable, the two detent elements being movable out of locking engagement by the inertial force of the inertial mass when a predetermined acceleration of the motor vehicle is exceeded.

9. A motor vehicle occupant protection arrangement according to claim 8 wherein one of the two elements is stationary and the other element is connected to the cover.

10. A motor vehicle occupant protection arrangement according to claim 1 wherein a movement of the cover out of its position closing the exit opening into its position clearing the exit opening is induced by at least one of the inertial force exerted by the inertial mass on the cover, a component of the gravitational force of a weight of the cover or of a weight connected to the cover, and a force exerted on the cover by the unfolding airbag.

11. A motor vehicle occupant protection arrangement according to claim 1 wherein the movement of the cover into its position clearing the exit opening is reversible, and wherein the cover-retaining arrangement can be returned to its cover-retaining condition in which it securely holds the cover in its position closing the exit opening.

12. A motor vehicle occupant protection arrangement according to claim 1 wherein the inertial mass is pivotally supported at an acute angle with respect to the direction of travel of the motor vehicle.

13. A motor vehicle occupant protection arrangement according to claim 1 wherein the inertial mass is supported for displacement in a direction which approximately coincides with the direction of travel of the motor vehicle.

14. A motor vehicle occupant protection arrangement according to claim 1 wherein the cover-retaining arrangement is released when there is a negative acceleration of the motor vehicle which is less than a negative acceleration required for activation of the airbag.

15. A motor vehicle occupant protection arrangement according to claim 1 wherein the inertial mass acts on a blocking element for the cover-retaining arrangement.

16. A motor vehicle occupant protection arrangement according to claim 1 wherein unfolding of the airbag assists movement of the cover out of a position closing the exit opening into a position clearing the exit opening.

17. A motor vehicle occupant protection arrangement according to claim 1 wherein the cover has a surface facing an unfolding airbag which is inclined at an acute angle with respect to an unfolding direction of the airbag.

18. A motor vehicle occupant protection arrangement according to claim 1 wherein the airbag is folded in such a way that folds which are in the vicinity of a rear end of the cover with respect to the direction of opening movement of the cover are unfolded first so as to extend through a cleared part of the exit opening.

* * * * *